(12) United States Patent
Winkler (10) Patent No.: US 9,205,982 B2
(45) Date of Patent: Dec. 8, 2015

(54) DISTRIBUTION WAREHOUSE AND METHOD FOR ARRANGING DIFFERENT ARTICLES IN AN ORDER-ORIENTED MANNER BY MEANS OF A REDUCED BUFFER

(71) Applicant: SSI SCHAFER PEEM GMBH, Graz (AT)

(72) Inventor: Max Winkler, Graz (AT)

(73) Assignee: SSI SCHÄFER PEEM GMBH, Graz (AT)

( * ) Notice: Subject to any disclaimer, the term of this patent is extended or adjusted under 35 U.S.C. 154(b) by 0 days.

(21) Appl. No.: 14/613,953

(22) Filed: Feb. 4, 2015

(65) Prior Publication Data

US 2015/0148939 A1 May 28, 2015

Related U.S. Application Data

(63) Continuation of application No. 14/105,319, filed on Dec. 13, 2013, which is a continuation of application No. PCT/EP2012/060562, filed on Jun. 5, 2012.

(30) Foreign Application Priority Data

Jun. 15, 2011 (DE) .......................... 10 2011 104 511

(51) Int. Cl.
*G06F 7/00* (2006.01)
*B65G 1/137* (2006.01)
(Continued)

(52) U.S. Cl.
CPC .............. *B65G 1/1373* (2013.01); *G05B 15/02* (2013.01); *G06Q 10/087* (2013.01); *G06Q 10/0875* (2013.01); *G06Q 50/28* (2013.01)

(58) Field of Classification Search
CPC ...... G06Q 10/087; G06Q 10/08; A61J 7/0084
USPC .......................................................... 700/216
See application file for complete search history.

(56) References Cited

U.S. PATENT DOCUMENTS 8,195,326 B2 6/2012 Schaefer
8,560,114 B2 10/2013 Suess et al.
(Continued)

FOREIGN PATENT DOCUMENTS

DE 40 11 823 A1 10/1991
DE 40 15 935 A1 11/1991
(Continued)

OTHER PUBLICATIONS

International Search Report for corresponding PCT Application No. PCT/EP2012/060562 dated May 23, 2013.
(Continued)

*Primary Examiner* — Kyle Logan
(74) *Attorney, Agent, or Firm* — Renner, Otto, Boisselle & Sklar, LLP (57) ABSTRACT

A method for arranging different articles in an order-oriented manner from a long-term warehouse in accordance with a plurality of orders, in particular picking orders, is proposed, comprising the following steps: a) defining an analysis quantity, which comprises a quantity of n orders, wherein each of the orders of the analysis quantity comprises at least one order line, wherein each of the order lines respectively specifies an ordered article with regard to an article type thereof and with regard to an ordered number of pieces; b) quasi-continuously transferring stored articles in an article-pure manner from the long-term warehouse to the short-term warehouse comprising the steps of: i) selecting an arbitrary one of the article types contained in the analysis quantity; ii) analyzing each of the orders of the analysis quantity in dependence on the selected article type; iii) determining total requirements of the selected article type; iv) transferring the total requirements of the selected article type from the long-term warehouse to the short-term warehouse; v) repeating the steps i) to iv) for one other article type contained in the analysis quantity, which has not yet been selected, until each of the article types contained in the analysis quantity are selected, analyzed and transferred; c) determining at least one complete order, preferably by repeatedly determining and checking the transferred articles with regard to complete orders, wherein a complete order is one of the orders of the analysis quantity the associated articles thereof all being already present in the short-term warehouse; d) discharging a subset of the transferred articles from the short-term warehouse, wherein the subset comprises at least all of the ordered articles of the at least one complete order; and e) repeating the steps c) and d) until each of the orders of the analysis quantity has become complete.

16 Claims, 7 Drawing Sheets

(51) Int. Cl.
*G06Q 10/08* (2012.01)
*G06Q 50/28* (2012.01)
*G05B 15/02* (2006.01)

(56) References Cited

U.S. PATENT DOCUMENTS

2012/0118699 A1* 5/2012 Buchmann et al. ........ 198/347.1
2012/0232689 A1* 9/2012 Buchmann et al. ........... 700/216

FOREIGN PATENT DOCUMENTS

| DE | 10 2007 011 856 A1 | 9/2008 |
| DE | 10 2008 036 564 A1 | 2/2010 |
| DE | 10 2008 046 325 A1 | 3/2010 |
| DE | 20 2010 005 643 U1 | 9/2010 |
| DE | 10 2009 019 511 B3 | 3/2011 |
| EP | 0 860 382 A1 | 8/1998 |
| EP | 2 098 464 A1 | 9/2009 |
| EP | 2 327 644 A1 | 6/2011 |
| WO | 2007/068406 A1 | 6/2007 |
| WO | 2010/127769 A1 | 11/2010 |

OTHER PUBLICATIONS

Poulos et al. "A Pareto-Optimal Genetic Algorithm for Warehouse Multi-Objective Optimization", Engineering applications of Artificial Intelligence, 14; pp. 737-749, 2001.

Kleinekathöfer, "Functional Description for the Control and Software Development of the Pick Rotor System and Next South Elmsall", Manual dated Jul. 2, 2007.

Opposition letter filed by Rau, Schneck & Huebner on Jan. 17, 2013 in opposition relating to counterpart German Application No. 10 2011 104 511.6, with partial English translation of Section V.A. and claim chart.

* cited by examiner

DISTRIBUTION WAREHOUSE AND METHOD FOR ARRANGING DIFFERENT ARTICLES IN AN ORDER-ORIENTED MANNER BY MEANS OF A REDUCED BUFFER

RELATED APPLICATIONS

This application is a continuation of U.S. application Ser. No. 14/105,319 filed Dec. 13, 2013, which is a continuation of international patent application PCT/EP2012/060562 filed on Jun. 5, 2012, which claims the priority of the German patent application DE 10 2011 104 511.6 filed on Jun. 15, 2011, all of which are herewith incorporated herein by reference.

BACKGROUND OF THE INVENTION

The present invention relates to a method for arranging different articles in an order-oriented manner from a long-term warehouse in accordance with a plurality of orders, in particular picking orders, and also relates to a distribution system and a computer program.

RELATED PRIOR ART

Many processes within a distribution warehouse require buffering of to-be-picked articles, in particular picking process, i.e. when articles are arranged in accordance with orders. However, in general buffering is a no value-added process and additionally requires space and corresponding equipment.

DE 10 2009 019 511 B3 discloses a storage and picking system. DE 10 2008 036 564 A1 discloses a scalable shipping buffer. DE 10 2008 046 325 A1 discloses a system and method for automatically picking articles into order containers. DE 20 2010 005 643 U1 discloses a system for managing material flow in a warehouse by means of computers.

SUMMARY OF THE INVENTION

Therefore, it is an object of the present invention to provide an enhanced distribution system and an enhanced method for arranging (in an order-oriented manner) different articles from a long-term warehouse in accordance with a plurality of orders.

According to a first aspect of the invention it is disclosed a method for arranging different articles in an order-oriented manner from a long-term warehouse in accordance with a plurality of orders, in particular picking orders, which comprises the following steps: a) defining an analysis quantity comprising a quantity of n orders, wherein each of the orders of the analysis quantity comprises at least one order line, wherein each of the order lines respectively specifies one ordered article with regard to an article type thereof and with regard to number of pieces; b) quasi-continuously transferring in an article-pure manner stored articles from a long-term warehouse to a short-term warehouse comprising the following steps: i) selecting one arbitrary article type contained in the analysis quantity; ii) analyzing each of the orders of the analysis quantity in dependence on the selected article type; iii) determining total requirements for the selected article type; iv) transferring the total requirements of the selected article type from the long-term warehouse to the short-term warehouse; v) repeating the steps i) to iv) for one other article type which is contained in the analysis quantity and which has not yet been selected, until each article type which is contained in the analysis quantity is selected, analyzed and transferred; c) determining at least one complete order, preferably by repeatedly scanning and checking the transferred articles with regard to complete orders, wherein a complete order is one of the orders of the analysis quantity, the associated articles of which are already in the short-term warehouse; d) discharging a subset of transferred articles from the short-term warehouse, wherein the subset includes at least all of the ordered articles of the at least one complete order; and e) repeating the steps c) and d) until each of the orders of the analysis quantity has become complete.

According to a second aspect it is disclosed, in a distribution system which comprises a long-term warehouse and a short-term warehouse, a method for arranging articles of different article types in an order-oriented manner from the long-term warehouse in accordance with a plurality of orders, comprising the following steps: a) defining an analysis quantity, which comprises a quantity of several orders, wherein each of the orders of the analysis quantity comprises at least one order line, wherein each of the order lines respectively specifies an ordered article with regard to the respective article type and with regard to a respectively ordered number of pieces; b) transferring stored articles in an article-oriented manner from the long-term warehouse to the short-term warehouse comprising the steps of: i) selecting an arbitrary one of the article types contained in the analysis quantity; ii) analyzing each of the orders of the analysis quantity in dependence on the selected article type; iii) determining total requirements of the selected article type; iv) transferring the total requirements of the selected article type from the long-term warehouse to the short-term warehouse; v) repeating the steps i) to iv) for another one of the article types con-tained in the analysis quantity, which has not yet been selected, until each one of the article types contained in the analysis quantity is selected, analyzed and transferred; c) determining at least one complete order, wherein a complete order is one of the orders of the analysis quantity the associated articles of which are all already located in the short-term warehouse; d) discharging a subset of the transferred articles from the short-term warehouse, wherein the subset comprises at least each of the ordered articles of the at least one complete order; and e) repeating the steps c) and d) until each of the orders of the analysis quantity is completed.

In addition, a third aspect of the invention relates to a distribution system having a long-term warehouse, a short-term warehouse, a conveyor and a control, wherein the conveyor connects the long-term warehouse in a conveying manner to the short-term warehouse, and wherein the control is adapted to execute the method of the present invention.

According to a fourth aspect of the invention it is disclosed a distribution system comprising a long-term warehouse, a short-term warehouse, a conveyor, and a control, wherein the conveyor connects the long-term warehouse in a conveying manner to the short-term warehouse, and wherein the control is adapted to execute the following steps: a) defining an analysis quantity, which comprises a quantity of several orders, wherein each of the orders of the analysis quantity comprises at least one order line, wherein each of the order lines respectively specifies an ordered article with regard to the respective article type and with regard to a respectively ordered number of pieces; b) transferring stored articles in an article-oriented manner from the long-term warehouse to the short-term warehouse comprising the steps of: i) selecting an arbitrary one of the article types contained in the analysis quantity; ii) analyzing each of the orders of the analysis quantity in dependence on the selected article type; iii) determining total requirements of the selected article type; iv) transferring the total requirements of the selected article type from the long-term warehouse to the short-term warehouse; and v) repeating the steps i) to iv) for another one of the article types contained in the analysis quantity, which has not yet been selected, until each one of the article types contained in the analysis quantity is selected, analyzed and transferred; c) determining at least one complete order, wherein a complete order is one of the orders of the analysis quantity the associated articles of which are all already located in the short-term warehouse; d) discharging a subset of the transferred articles from the short-term warehouse, wherein the subset comprises at least each of the ordered articles of the at least one complete order; and e) repeating the steps c) and d) until each of the orders of the analysis quantity is completed A huge advantage of the invention is that the size (number of buffer locations) of the short-term warehouse (or of the buffer) can be reduced significantly. The size and capacity of the buffer of the present invention is significantly smaller than the capacity of a conventional buffer. As a result less parts (e.g. conveyors) are required for installing the buffer. The investment costs are reduced. The required space is reduced. Nevertheless, the throughput (completely processed orders per unit of time) is increased. The method of the invention is extremely flexible with regard to the determination of temporal limits of order windows. Rush orders can be inserted into the processing of a group of orders without problems at any time, and can be processed in particular with a higher priority.

In accordance with a preferred embodiment a first article type is selected during a first run of the step i), which belongs to a first order, and only during a subsequent run of the step i) such article types are selected next which also belong to the first order, before an article type is selected which belongs to another order.

Hence, the articles are not only transferred from the long-term warehouse into the short-term warehouse in an article-oriented manner, but are also processed in an order-oriented manner. The article-oriented transfer happens simultaneously to the article-oriented processing of the ordered articles.

This means, amongst other things, that the article types are selected in particular in an order-oriented manner in the step i).

With another advantageous embodiment the short-term warehouse is sized such that one or more of the complete orders are collected in the short-term warehouse before the short-term warehouse is full.

The short-term warehouse is to be sized such that at least one order can be collected completely. However, the short-term warehouse is significantly smaller than a conventional buffer which can receive all articles of all of the orders of the analysis quantity.

In particular this means that a capacity of the short-term warehouse is smaller than a total number of all of the ordered articles of all of the orders of the analysis quantity.

Further, it is preferred that the step of discharging happens while further article types, which are selected newly, are transferred article-purely.

This expresses the concurrence of the article-oriented and order-oriented processes which are utilized with the method of the invention It is ideal if the ordered articles are distributed in accordance with the Pareto principle. In particular, one or more different C-type articles can be transferred article-purely to the short-term warehouse on a speculative basis, e.g. based on average values, so that the article-oriented transfer of the article type(s) which belong to the corresponding C-type articles only happens once.

In this case, storage machine only needs to be moved once for putting all of the C-type articles of this type from the long-term warehouse into the buffer which occur in the orders over a longer unit of time, e.g. distributed over an entire day. The storage machine in the long-term warehouse is relieved. Conventionally, an analysis period which defines the analysis quantity, as a rule, is shorter than one day. This results, in particular for C-type articles, in a bad picking pattern, i.e. the C-type articles are frequently retrieved by the storage machines, namely often in very small quantities. The invention avoids this drawback.

Additionally, it is advantageous that the analysis quantity is analyzed with regard to existing article types before the step of article-pure transferring happens, in order to generate an overview of the different article types from which respectively one article type is selected in the step i).

This analysis can be useful for the retrieval of articles from the long-term warehouse. Instead of analyzing the orders in an order-oriented manner, the orders can be analyzed in a storage-location oriented manner. In this way, for example, such articles can be analyzed in a preferred manner which have a relatively short way from the long-term storage location to the short-term warehouse.

With another particular embodiment all of the method steps are conducted in an automated manner.

Then, the distribution system is operated fully automatically. All commands which are required for controlling the different components of the distribution system, in terms of material flow, are generated and output by the control so that a human interaction is not necessary. Of course, picking and/or packing can be done manually.

Further, it is an advantage if the step of checking for complete orders comprises: scanning the article types and the associated numbers of pieces of the transferred articles which are currently located in the short-term warehouse; and determining for each of the orders of the analysis quantity by comparison whether all associated ordered articles are detected in accordance with their article types and their respective numbers of pieces.

The determination of complete orders can already happen before one single article is put from the long-term warehouse to the short-term warehouse. In this case, the control has knowledge of the sequence of the article-pure transfer and can reserve, based on this knowledge, e.g. specific areas (buffer locations) in the buffer for specific orders. Additionally, the control can then have knowledge of which of the subsets can be discharged from the buffer at a specific point in time.

Further, it is advantageous if a rush order having high processing priority is added, preferably afterwards, to the analysis quantity and analyzed with regard to the article types contained therein, wherein the article types of the rush order are processed in accordance with the processing priority temporarily before such article types which have not yet been selected and which have a lower processing priority.

Rush orders can be added to the analysis quantity at any time, even if the analysis quantity is already determined. Due to the consideration of processing priorities the article type appearing in the rush order can be processed in a preferred manner, even if the article type of the rush order has already been processed (analyzed) in a conventional cycle during the processing of the analysis quantity. Thus, the invention allows to react fast and flexible with regard to rush orders, without affecting the remaining processes in the system in a disadvantageous manner.

With another preferred embodiment the subset discharged in the step d) is transferred to a sorting device, wherein such articles which belong to the complete orders are sorted out, and remaining articles which do not belong to any of the complete orders are buffered in the sorting device until missing articles can be discharged to the sorting device which are defining together with the remaining articles new complete orders.

In particular, the method of the invention additionally comprises the steps of: collecting a first group of orders comprising more than n orders which lie within a first temporal window, wherein the analysis quantity corresponds to a second group of orders which lies within a second temporal window being smaller than the first temporal window; and repeatedly returning to the step a) if each of the orders of the analysis quantity has become one of the complete orders, in order to define a new analysis quantity based on such orders of the first group which lie outside of the second temporal window and within the first temporal window until each of the orders of the first group has become one of the complete orders and has been discharged.

In accordance with still another aspect of the invention a computer program is proposed, which is adapted to execute a method comprising the steps of: a) defining an analysis quantity, which comprises a quantity of several orders, wherein each of the orders of the analysis quantity comprises at least one order line, wherein each of the order lines respectively specifies an ordered article with regard to the respective article type and with regard to a respectively ordered number of pieces; b) transferring stored articles in an article-oriented manner from a long-term warehouse to a short-term warehouse comprising the steps of: i) selecting an arbitrary one of the article types contained in the analysis quantity; ii) analyzing each of the orders of the analysis quantity in dependence on the selected article type; iii) determining total requirements of the selected article type; iv) transferring the total requirements of the selected article type from the long-term warehouse to the short-term warehouse; and v) repeating the steps i) to iv) for another one of the article types contained in the analysis quantity, which has not yet been selected, until each one of the article types contained in the analysis quantity is selected, analyzed and transferred; c) determining at least one complete order, wherein a complete order is one of the orders of the analysis quantity the associated articles of which are all already located in the short-term warehouse; d) discharging a subset of the transferred articles from the short-term warehouse, wherein the subset comprises at least each of the ordered articles of the at least one complete order; and e) repeating the steps c) and d) until each of the orders of the analysis quantity is completed.

BRIEF DESCRIPTION OF THE DRAWINGS

It is clear that the above-mentioned and hereinafter still to be explained features cannot only be used in the respectively indicated combination but also in other combinations or alone, without departing from the scope of the present invention.

Exemplary embodiments of the invention are shown in the drawings and will be explained in the subsequent specification, wherein.

PREFERRED EMBODIMENTS OF THE INVENTION

Figure 1:
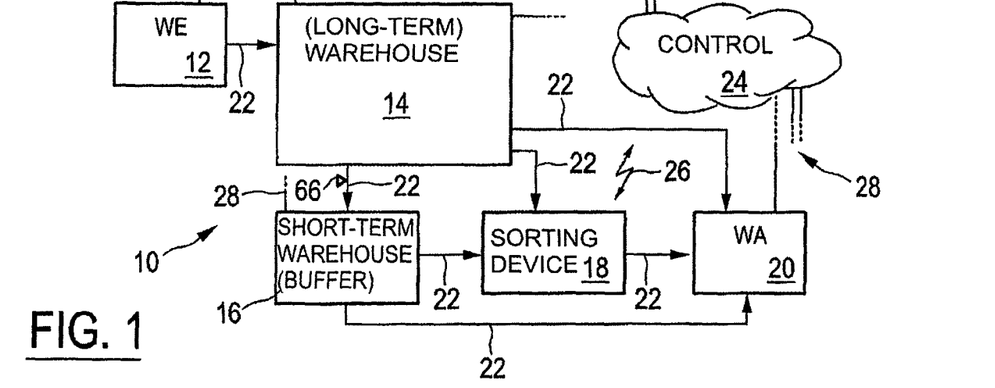
FIG. 1 shows a block diagram of a distribution system in accordance with the invention.

FIG. 1 shows a block diagram of a distribution system or distribution device 10 in accordance with the invention.

The distribution system 10 can comprise a goods receipt (WE) 12, a long-term warehouse 14, a short-term warehouse (hereinafter also designated as "buffer") 16, a sorting device 18, a goods issue (WA) 20 and/or a control device 24. The elements 12-20 can be connected to each other by means of a conveyor 22 (in a mutual manner). FIG. 1 shows some exemplary material flow connections in terms of one or more of the conveyors 22. In this sense the goods receipt 12 is connected to the long-term warehouse 14. The long-term warehouse 14 is respectively connected to the short-term warehouse, or the buffer, 16, the sorting device 18 and the goods issue 20. The short-term warehouse, or the buffer, 16 is connected to the sorting device 18. The sorting device 18 is connected to the goods issue 20. The conveyor 22 is a technical system which can have different complexities where conveying devices of same or different types can fulfill conveying tasks. There are different conveyor types such as roller conveyors, belt conveyors, chain conveyors, overhead conveyors and the like, which can be utilized. The present invention is compatible with all of the conveyor types. Preferably, overhead conveyors are used.

The control 24 can be connected in terms of control either wirelessly (cf. arrow 26) or via fixed lines 28 to the components 12-20. The control 24 can be responsible, amongst other things, for the material flow within the distribution system 10. The control 24 is responsible for preparations of orders and processings of orders.

Articles, which are not shown in more detail, are supplied in greater quantities via the goods receipt 12 to the distribution system 10. The articles are conveyed from the goods receipt 12 to the long-term warehouse 14. There, the articles serve as supply for processing (picking) orders.

One order consists of one or more order positions which are also designated as order lines. One order line indicates a respective quantity (number of pieces) of one article type which has been ordered by a customer. The structure of an exemplary order will be explained in more details with reference to FIG. 3. An order batch is to be understood in the following as the concatenation of a number of orders to form a processing lot.

In the following an article is to be understood as a piece good. One article is a (smallest) unit of an article range which can be distinguished by article types. The piece goods are individually distinguishable goods which can be handled individually and stock of which is listed piecewise or in terms of a bundle. The bundle is a common term for one handable unit which can be moved manually or by means of technical devices (conveyors). Bundles can also be represented by a subset of one load unit such as a box of beverages on a pallet loaded completely with boxes of beverages. In the following, the terms article, bundle and piece good are used equivalently. If one article is transported via the conveyor 22 this is also called a conveying good.

Returning to FIG. 1 the articles are transferred temporarily from the long-term warehouse 14, which comprises a very huge storage capacity (typically several 100.000 articles) to the short-term warehouse, or the buffer, 16. The buffer 16 comprises a much smaller capacity (e.g. 5.000 articles) than the warehouse 14. The transfer of articles from the long-term warehouse 14 to the buffer 16 happens for the purpose of order-picking, i.e. for the purpose of arranging different articles in accordance with different orders. As soon as all articles of one order are in the buffer 16, the order is complete and can be discharged either to the sorting device 18 or directly to the goods issue 20. If the buffer 16 does not have a sorting functionality the articles can be discharged to the sorting device 18 for the purpose of sorting. Otherwise, i.e. if the buffer 16 has a sorting functionality or sorting is not required, the articles of the (complete) order can be supplied directly to the goods issue 20. It is clear that article-pure orders, i.e. orders comprising articles of one single article type only, can be transferred directly from the long-term warehouse 14 to the goods issue 20.

Figure 2:
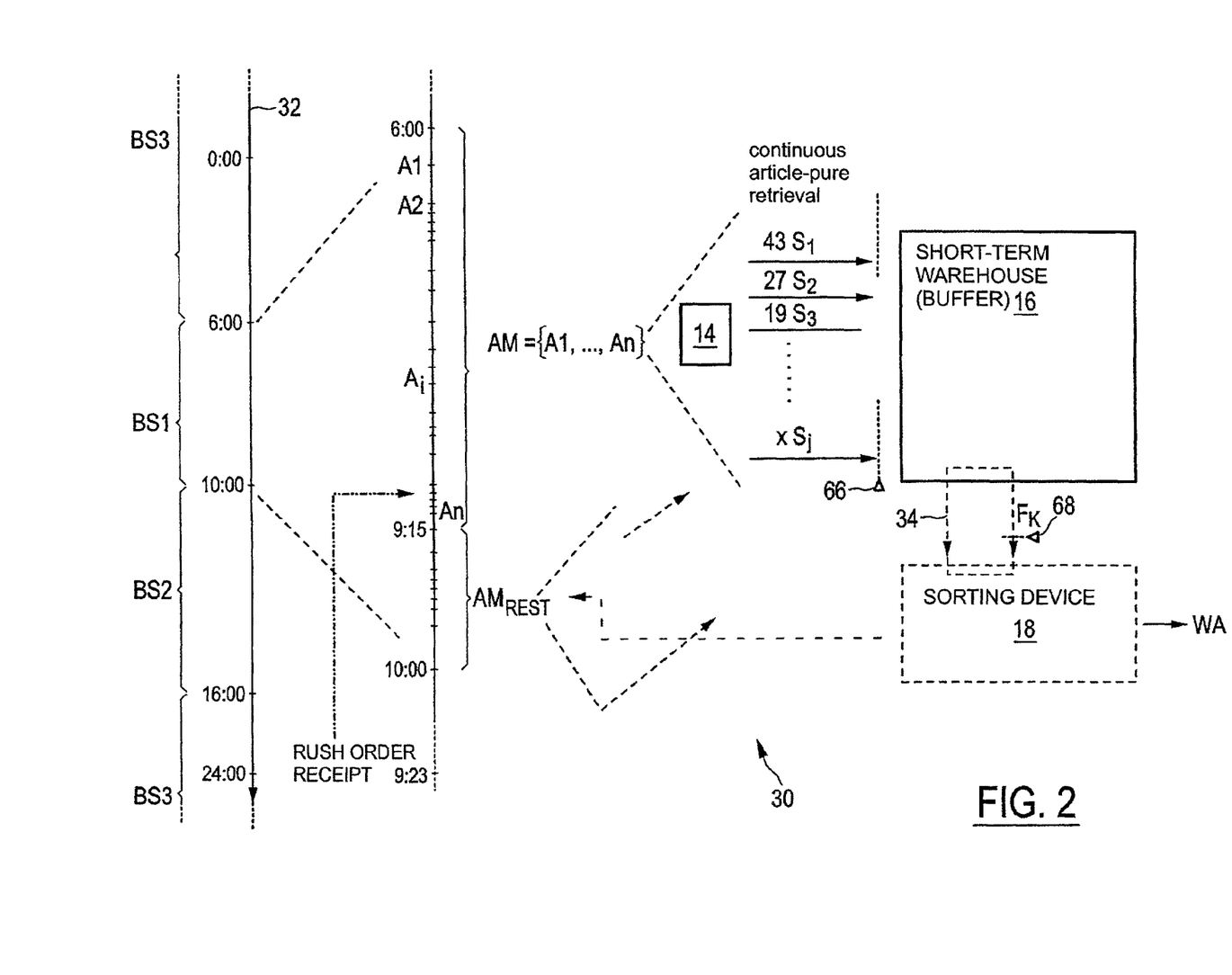
FIG. 2 shows a diagram for explaining preparation of orders and processing of orders in accordance with the invention.

In FIG. 2 diagram 30 is shown. The diagram 30 serves for explaining processes within the distribution system 10 with reference to orders Ai (i is an integer) which are received, for example, over an entire day and are processed. In the left half of FIG. 2 a vertically oriented time beam 32 is shown for visualizing one day (0:00 a.m.-12:00 p.m.). One day can be divided temporarily into different order slots (BS). In FIG. 2 three order slots BS1-BS3 are shown. A first order slot can comprise, for example, such orders Ai which are received between 6:00 a.m. and 10:00 a.m., wherein the order receipt does not need to happen physically within the distribution system 10. The orders Ai can be put at traders, for example, via the Internet, who in turn send the so-collected orders electronically or via mail to the distribution system 10. A second order slot BS2 can last from 10:00 a.m.-4:00 p.m. A third order slot can last from 4:00 p.m.-6:00 a.m. of the next day. After that the cycle begins from the start. It is clear that temporal limits of the order slots BS can be set variably as will be explained hereinafter in more detail.

In order to facilitate the explanation of the present invention, the first order slot BS1 is exemplarily viewed hereinafter. For this purpose the time beam 32 is shown at the right hand side in a zoomed manner. In total, m=n+10 orders Ai (i=1 . . . , n+10) are received in the order slot BS1 between 6:00 a.m. and 10:00 a.m. The orders Ai can be numbered continuously dependent on the respective temporal receipt. In order to avoid waiting to 10:00 a.m., so that the processing of the orders Ai can be started, a first subset of the n+10 orders Ai can be selected for further processing exemplarily at 9:15 a.m. In this manner a (first) analysis quantity AM is defined including all the orders Ai (i=1, . . . , n) wherein the last order received before 9:15 a.m. is the order An. Hence the analysis quantity AM is defined by $$AM=\{A1, \ldots, An\}.$$

It is clear that a temporal division of an individual order slot BS into a number of analysis quantities is of an exemplary nature only. Typically one order slot BS is converted to one single analysis quantity. A big advantage of the invention is to be seen in that, under a pre-given search depth (i.e. including pre-given temporal limits of the analysis quantity), the physical size (capacity) of the short-term warehouse or the buffer 16 is reduced in comparison to conventional approaches. This is achieved by a (quasi-)continuous partial emptying of the buffer 16. For the purpose of performing the partial emptying as fast and reasonable (in terms of the picking orders) as possible the buffer 16 is filled in accordance with the invention. The buffer 16 is filled in such a manner that a reasonable partial emptying can happen as fast as and as frequent as possible. In this case all the articles required for the partial emptying (subset/group of orders) are in the buffer 16. Thus, the analysis quantity is normally not restricted as will be explained hereinafter.

Thus, as it will be explained exemplarily hereinafter in more detail, the orders Ai of the analysis quantity AM are analyzed with regard to the article types—preferably in an order-oriented manner—contained in the analysis quantity AM for determining how many piece goods or articles of a $j^{th}$ article type Sj are required in total in all of the orders Ai of the analysis quantity AM. In FIG. 2, for example, 43 articles S1 of the first article type, 27 articles S2 of the second article type, 19 articles S3 of the third article type, and so on are required. Each of the article types Sj is retrieved article-purely from the long-term warehouse 14 and stored in the buffer 16. The article types Sj are transferred subsequently, i.e. quasi-continuously, from the long-term warehouse 14 to the buffer 16 as soon as it is respectively clear how many articles of the article type Sj are required (total requirements). The article-pure movement has the advantage that a storage machine (not shown) in the long-term warehouse 14 is operated for each article type Sj in best case only one single time for processing all of the orders Ai of the order slot BS. The retrieval from the long-term warehouse 14 thus happens in an article-oriented manner. As soon as the first article type S1 is analyzed, it is transferred and the analysis quantity AM is analyzed in dependence on a second article type S2. As soon as the first article type S1 has been transferred and the analysis with regard to the second article type S2 is finished, the second article type S2 can be transferred. This is repeated until all of the article types of all of the orders Ai of the analysis quantity AM are analyzed and transferred. Thus, the buffer 16 is filled continuously over time.

While the buffer 16 is filled with growing time, it can be checked repeatedly whether all of the articles of any (arbitrary) order Ai are present in the buffer 16. It is clear that the control 24 can already determine in advance at which time all of the articles of one of the orders Ai are completely present in the buffer 16. In this case it is only detected whether a required article type Sj has been transferred to the buffer 16 (e.g. by means of a sensor 66 at the entry of the buffer).

As soon as at least one of the orders Ai is completely present in the buffer 16, i.e. all of the articles of this order are present, a subset, which is also designated hereinafter as a fragment, of articles located in the buffer 16 can be discharged. The discharging can happen optionally to the sorting device 18 (capacity: e.g. 500 articles) if the buffer 16 itself is not provided with a sorting functionality. Thus, the buffer 16 is continuously filled and emptied so that the buffer 16 needs to have a small capacity only.

The fact that subsets or fragments Fk are discharged again and again is indicated in FIG. 2 by means of a broken line 34 which is formed like a loop.

If all of the orders Ai are complete and have been discharged, and if the analysis quantity AM has not included all of the orders Ai of the order slop BS, as it is the case e.g. for the order slot BS1 in FIG. 2, the method of the invention can be applied to one or more remaining analysis quantities $AM_{REST}$, containing such orders Ai which came in, for example, in a temporal window reaching from 9:15 a.m.-10:00 a.m. This is the quantity $\{A_{n+1}, \ldots, A_{n+10}\}=AM_{REST}$ in FIG. 2.

Figure 3:
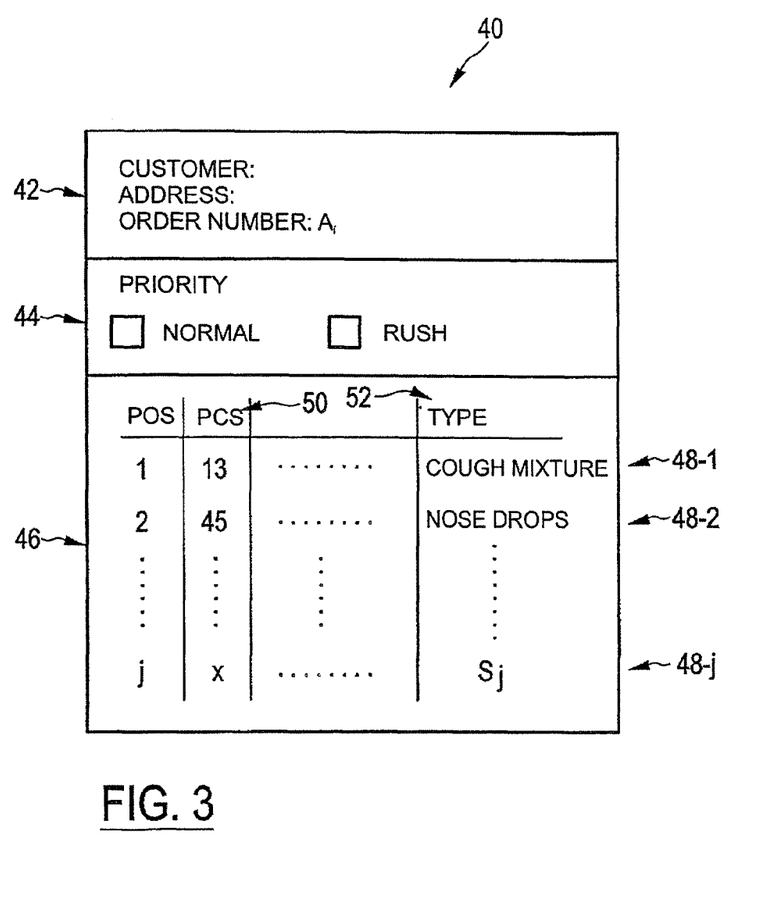
FIG. 3 shows an exemplary customer order or picking order.

With reference to FIG. 3 one of the orders 14 is exemplarily shown, which typically is provided and processed in terms of a data set. The order 14 can comprise a header 42, a priority field 44 and/or an article field 46. The header 42' can comprise, amongst other things, information on the customer who has put the order, to (customer's) addresses or to customer's identification number as well as an order number. The priority field 44 contains information on whether the order is normal or a rush order. Rush orders are orders with high (processing) priorities which are typically handled in a preferred manner compared to the normal orders, and can be added to the analysis quantity AM afterwards.

The article field 46 comprises order lines 48-1 to 48-j. Each of the order lines 48 comprises at least information on a number 50 of pieces of an ordered article or on an article type 52. The first order line 48-1 at the first position (pos.1) represents an order of 13 units of cough mixture. The order line 48-2 at the second position represents an order of 45 units of nose drops. It is clear that the example selected from the field of pharmaceuticals can also be applied to other fields such as food retail, online book trade or similar. Typically each of the lines 48 represents a different article type Sj. The same article type Sj, however, can also be present several times within one order Ai.

Figure 4:
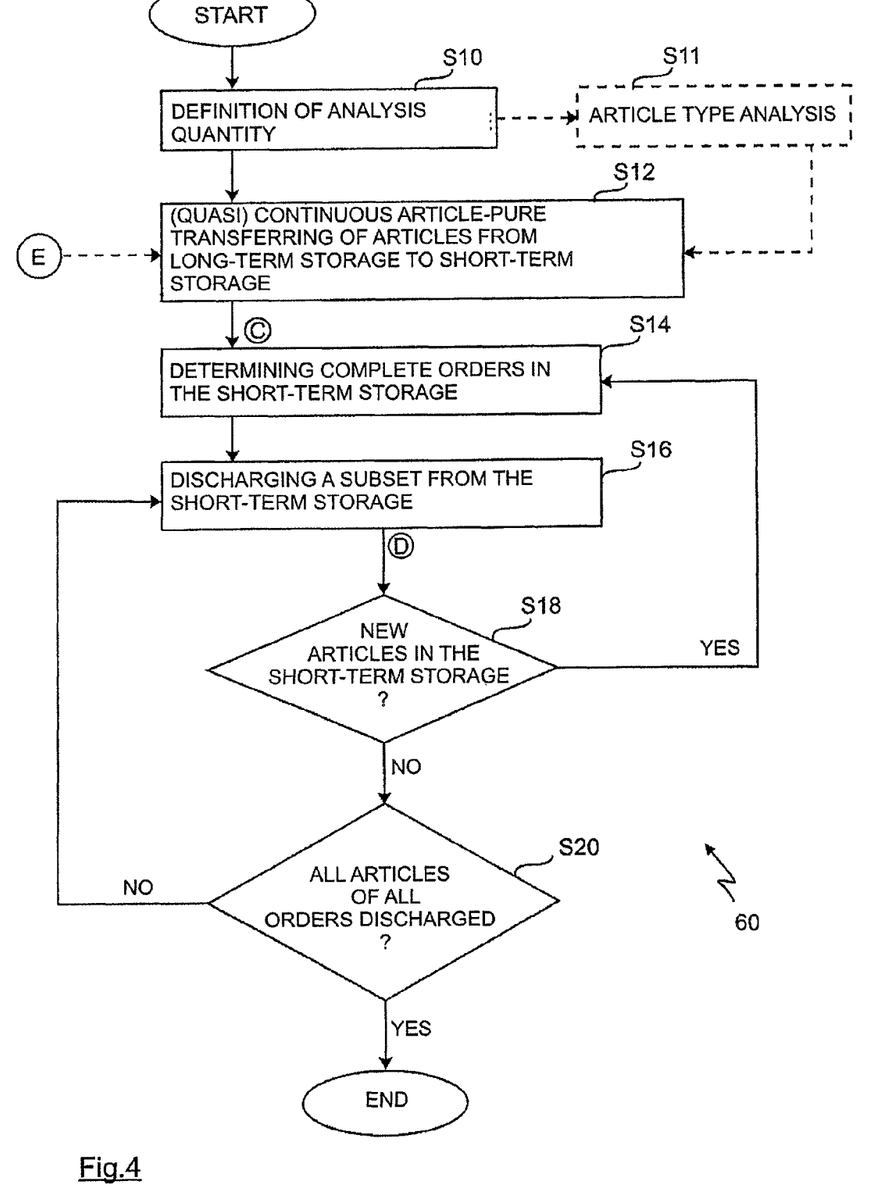
FIG. 4 shows a flowchart of a method in accordance with the invention.

In FIG. 4 a flow chart of a method 60 in accordance with the invention is shown. The method 60 serves for arranging stored articles in accordance with one order 40 as shown exemplarily in FIG. 3.

In a first step S10 the analysis quantity AM is defined (cf. FIG. 2). The analysis quantity AM comprises n orders Ai. Each of the orders Ai of the analysis quantity AM comprises at least one order line 48. Each of the order lines 48 specifies one ordered article dependent on its article type 52 and its ordered number 50 of pieces. The sum of all of the articles of the analysis quantity AM can be expressed by the following equation:

$$\sum_{i=1}^{n}\sum_{j=1}^{m} \alpha j\, Sij$$

The index i represents the order number. The index j represents the order line of each of the orders. The factor αj represents the number 50 of pieces of the associated order line 48-j.

In a second step S12 stored articles are transferred from the long-term warehouse 14 (quasi-)continuously, i.e. article-wise, in an article-pure manner and continuously, into the buffer 16. The step S12 is explained in more detail in FIG. 5A.

In the next step S14 complete orders are determined. A complete order is one of the orders Ai of the analysis quantity AM, the associated articles of which have all already been transferred to the buffer 16.

The feeding of (new) articles from the long-term warehouse 14 to the buffer 16 can be detected. Thus the control 24 has information on that the new article has arrived in the buffer 16 and thus is available for further processing. Also, the article type 52 (once again) can be detected additionally (e.g. by means of RFID-tags).

In a step S16 one subset of articles present in the buffer 16 is discharged from the buffer 16. The subset includes all of the articles which belong to at least one of the complete orders. The subset can also include more articles than comprised in the at least one complete order. Such additional articles do not need to form an individual complete order again.

In a step S18 it is checked whether new articles have been fed to the buffer 16. If new articles have been fed to the buffer 16, new complete orders can be discharged in terms of a new subset from the buffer 16.

If no new articles have been added to the buffer 16 it is inquired in a step S20 whether all of the articles of all of the orders of the analysis quantity AM have been discharged. If not all of the articles have been discharged, it is returned to the step S16 while new complete orders are determined. If all of the articles of all of the orders have been discharged, the method, as a rule, ends except that the analysis quantity AM does not include all of the orders Ai of a respective one of the order slots BS. If there are remaining residual orders (cf. the orders An+1 through An+10 in FIG. 2) it is returned to the step S10.

Figure 5A:
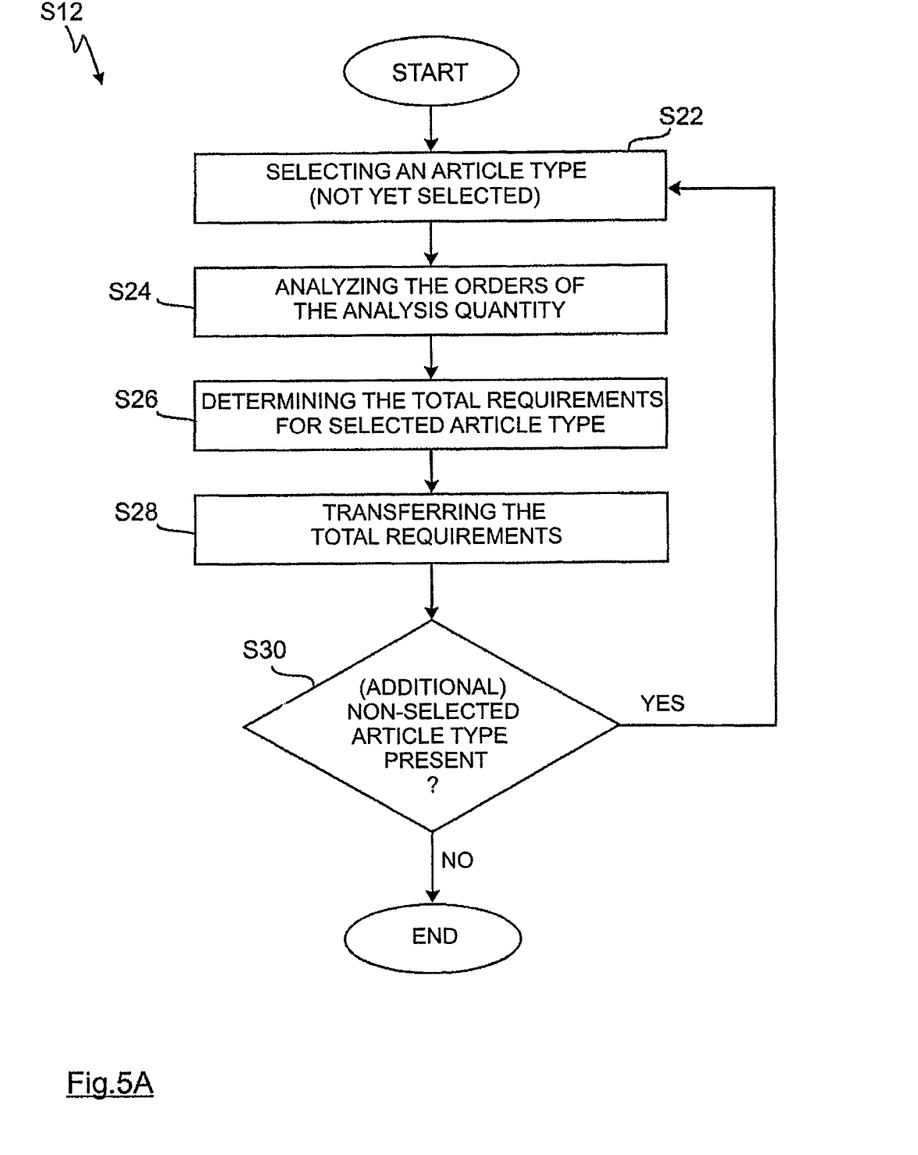
FIG. 5A shows a flowchart of the step S12 of FIG. 4.

In FIG. 5A the method step S12 of FIG. 4 is explained in more detail in terms of a flow chart. The method step S12 comprises the following steps: selecting one article type Sj (which has not been selected before) from all of the orders of the analysis quantity AM (step S22); analyzing the orders Ai of the analysis quantity AM (step 24) with regard to the selected article type Sj; determining the total requirements of the selected article type (step S26); transferring the total requirements from the long-term warehouse 14 to the buffer 16 (step S28); and inquiring (step S30) whether (additional) article types which have not been selected are present, wherein it is returned to the step S22 if not all of the selected article types are present. Preferably all of the article types of one order are selected at first before article types of another order are selected. The deeper one enters into the orders during the selection of the article types, the more orders are automatically finished before it is actually their turn for being analyzed.

In order to allow conduction of the steps S22 through S30 in FIG. 5A in an easier manner, it can be wise to integrate an intermediate step S11 between the steps S10 and S12 in the flow chart of FIG. 4. This intermediate step S11 is indicated in FIG. 4 by means of broken lines. In the step S11 an article-type analysis can be conducted with regard to all of the orders Ai after successful definition of the analysis quantity AM. During the article type analysis it determined which different article types Sj in all of the n orders Ai of the analysis quantity are present.

Returning to FIG. 5A, a first article type S1 of a first order A1 is typically selected in step S22 by means of the first order line 48-1. Then, all of the remaining orders Ai (i≠1) of the analysis quantity AM are checked in step S24 with regard to the article type S1 (step S24). In this manner a total number of pieces, or the total requirements, of the selected article type S1 can be determined in the step S26. All of the numbers 50 of pieces from all of the orders An are summed up which concern the article type S1. As soon as the total requirements (overall number of pieces) is determined the control 24 (cf. FIG. 1) causes the retrieval of a corresponding number of pieces of articles of the article type S1 from the long-term warehouse 14 for transferring same to the buffer 16 (step S28). Subsequently, it is returned to the step 22 and preferably the second article type S2 is selected, which is defined by the second order line 48-2 of the first order A1, if the second order line 48-2 is present. This course of action is repeated until all of the article types S1j, which are contained in the first order A1, have been transferred by their respective total requirements to the buffer 16 for the entire analysis quantity AM. If all of the articles of the first order A1 have been transferred to the buffer 16, one continues preferably with the first article type S21 of the first order line 48-1 of the second order A2 in the step S22, provided that this article type is not already identical to one of the article type S1 j of the first order A1. If one of the article types S2j of the second order A2 has already been finished by way of processing one of the article types S1j of the first order A1, the corresponding order line 48 of the second order A2 is skipped. This is repeated until an article type Sj is reached, which up to now has not been selected and transferred.

The deeper the orders Ai are processed during the method in accordance with FIG. 5A, the more often article types Sj have already been analyzed. Thus, the advantages of an article-oriented retrieval from the long-term warehouse 14 (batch picking) are utilized.

Figure 5B:
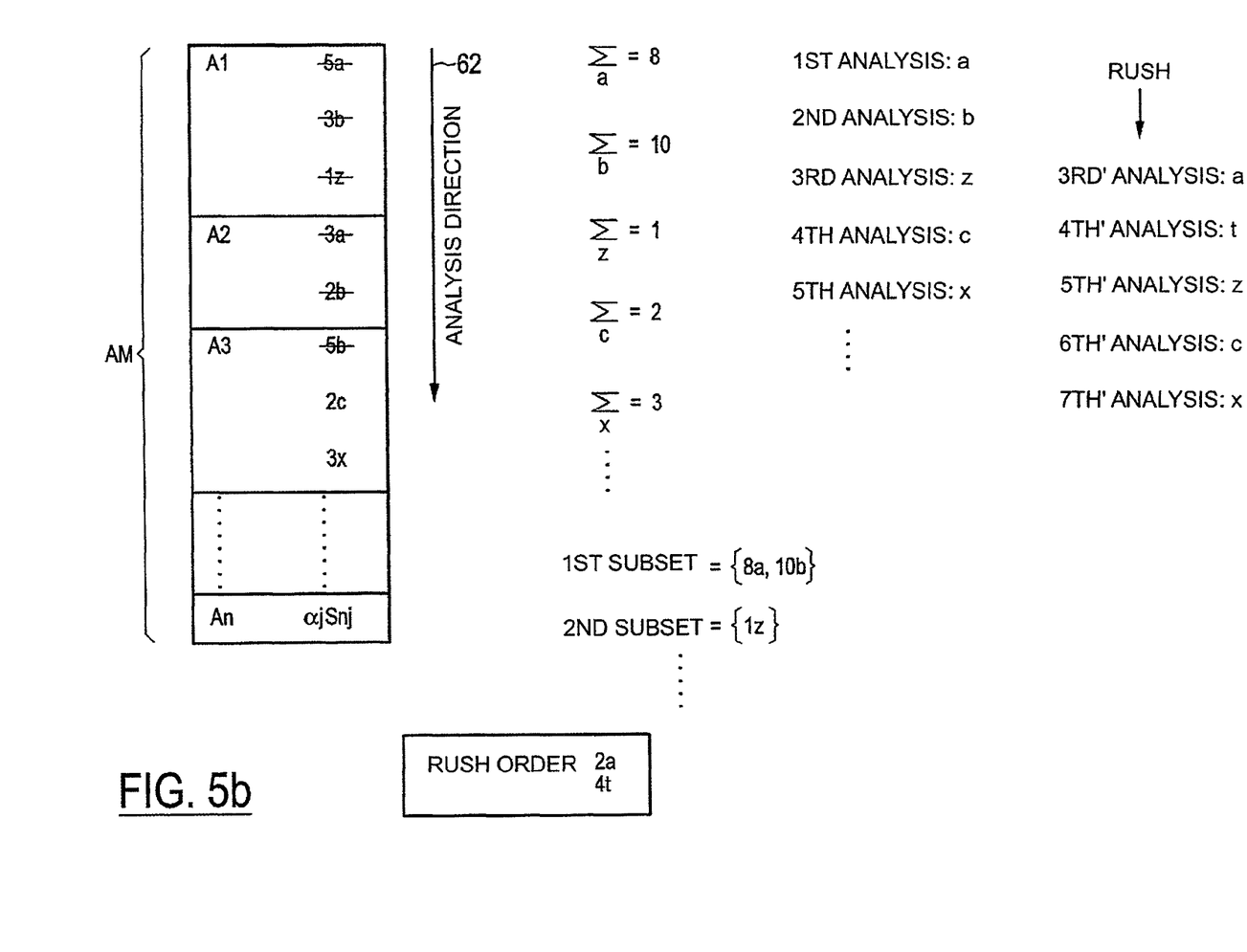
FIG. 5B shows an example for explaining FIG. 5A.

In FIG. 5B an example for explaining the method steps of FIG. 5A is shown. In the left part of FIG. 5B an analysis quantity AM having n orders Ai is shown wherein only the first three orders A1 through A3 are shown in more detail. The first order A1 represents one order of five articles "a", three articles "b" and one article "z". The second order A2 represents one order of three articles "a" and two articles "b". The third order A3 represents one order of five articles "b", two articles "c" and three articles "x".

In accordance with the step S22 of FIG. 5A the first article "a" of the first order A1 is selected for the purpose of analysis. It is clear that each of the other orders of the analysis quantity AM could have been selected as the starting order. For example, if the order A3 would have been analyzed first, the article type "b" would have been selected first.

Returning to the first order A1 as a starting order having the first selected article type "a" the orders Ai of the analysis quantity AM are all analyzed with regard to the article type "a". This is indicated in FIG. 5B by means of an arrow 62 being oriented vertically downwards, which indicates the direction of analysis.

In accordance with the step S26 of FIG. 5A in total eight articles "a" are obtained as the total requirements after a first analysis run. These articles are transferred in accordance with the step S28.

After the first analysis run no articles are discharged in accordance with the step S14 of FIG. 4 since merely eight articles "a" are located in the buffer 16. None of the orders Ai of the analysis quantity AM of FIG. 5B is complete due to the eight articles "a". For the purpose of a simplified explanation, hereinafter only the first three orders A1 through A3 of FIG. 5B are considered.

In accordance with the step S30 of FIG. 5A it is then inquired whether additional non-selected article types Sj are present, after all of the orders Ai of the analysis quantity AM have been analyzed with regard to the article type "a". Since the first order A1 comprises the article type "b" which has not yet been selected, the article type "b" is subsequently selected in accordance with the step S22. Then, the analysis quantity AM is analyzed with regard to the article type "b" (step S24). In this way, total requirements of ten articles "b" (step S26) is obtained. The total requirements is transferred again to the buffer 16 in accordance with the step S28.

After the analysis quantity AM has been analyzed in dependence on the article types "a" and "b", which is indicated in FIG. 5B in that the articles "a" and "b" have been crossed out in the orders A1 through A3, at least the order A2 is complete. All of the articles (three articles "a" and two articles "b") of the second order A2 have been transferred to the buffer 16. After each of the transfers in accordance with the step S28 of FIG. 5A the control 24 can check whether within the buffer 16 all of the articles of at least one complete order are present, except that the control 24 has not determined in advance that after the second analysis run with regard to the article type "b" at least the second order A2 is complete. In the first case, a sensor 66 (cf. FIG. 1) can be positioned, for example, at the entrance of the buffer 16, the sensor detecting the transfer of the articles, or the total requirements, from the long-term warehouse 14. In addition, an additional sensor 68 (cf. FIG. 1) can be provided at the exit of the buffer 16 for detecting such articles which are discharged from the buffer 16. Since all of the articles of the second order A2 are located within the buffer 16 in the example of FIG. 5B, a first subset can be discharged from the buffer 16, which at least includes the articles of the second order A2.

Provided that the buffer 16 does not have any sorting functionality at all, the subsets are typically discharged to a sorting device 18. In the described example of FIG. 5B the first subset can comprise, for example, the eight articles "a" and the ten articles "b" which have been transferred to the buffer 16 after the first two analysis steps. Thus, this first subset comprises the three articles "a" and the two articles "b" of the second order A2. Then the first subset comprises more articles as required for processing the second order A2. These "unnecessary" articles (5 times a and 8 times b) can remain in the sorting device 18 and be used for processing other orders requiring the article types "a" and "b" as soon as they are complete.

In a third analysis run, the analysis quantity AM is analyzed with regard to the article type "z" existing in the third order line of the first order A1 of FIG. 5B. Since no other order (of the orders A2 and A3) comprises the article type "z", the total requirements comprises one single article "z". After the article "z" has been transferred to the buffer 16, the control 24 knows, or determines, that the first order A1 is complete (as well). The one article "z" can be discharged from the buffer 16 in terms of a second subset since the remaining articles of the first order A1 have already been discharged by means of the first subset. It is clear that one can wait longer until more of the orders are complete so that the second subset does not only include the one article "z" during the discharge from the buffer 16.

Due to the example of FIG. 5B it is simply visible that the orders Ai of the analysis quantity AM do not necessarily need to be processed and finished according to the temporal sequence of an order receipt. For example, the second order A2 is processed and finished before the first order A1. The deeper the analysis quantity AM is analyzed, the more of the orders Ai are already complete before they are actually analyzed with regard to their article types. Since complete orders are to be discharged as fast as possible from the buffer 16, the size or capacity of the buffer 16 can be chosen very small. Thus, the investment costs are reduced. The arrangement of the articles with regard to the orders is accelerated. The arrangement of the orders Ai occurs extremely flexible. Rush orders can be incorporated at any time without problems into the already defined analysis quantity AM and, if desired, can be processed in a preferred manner. This will be explained in more detail below.

Figure 6:
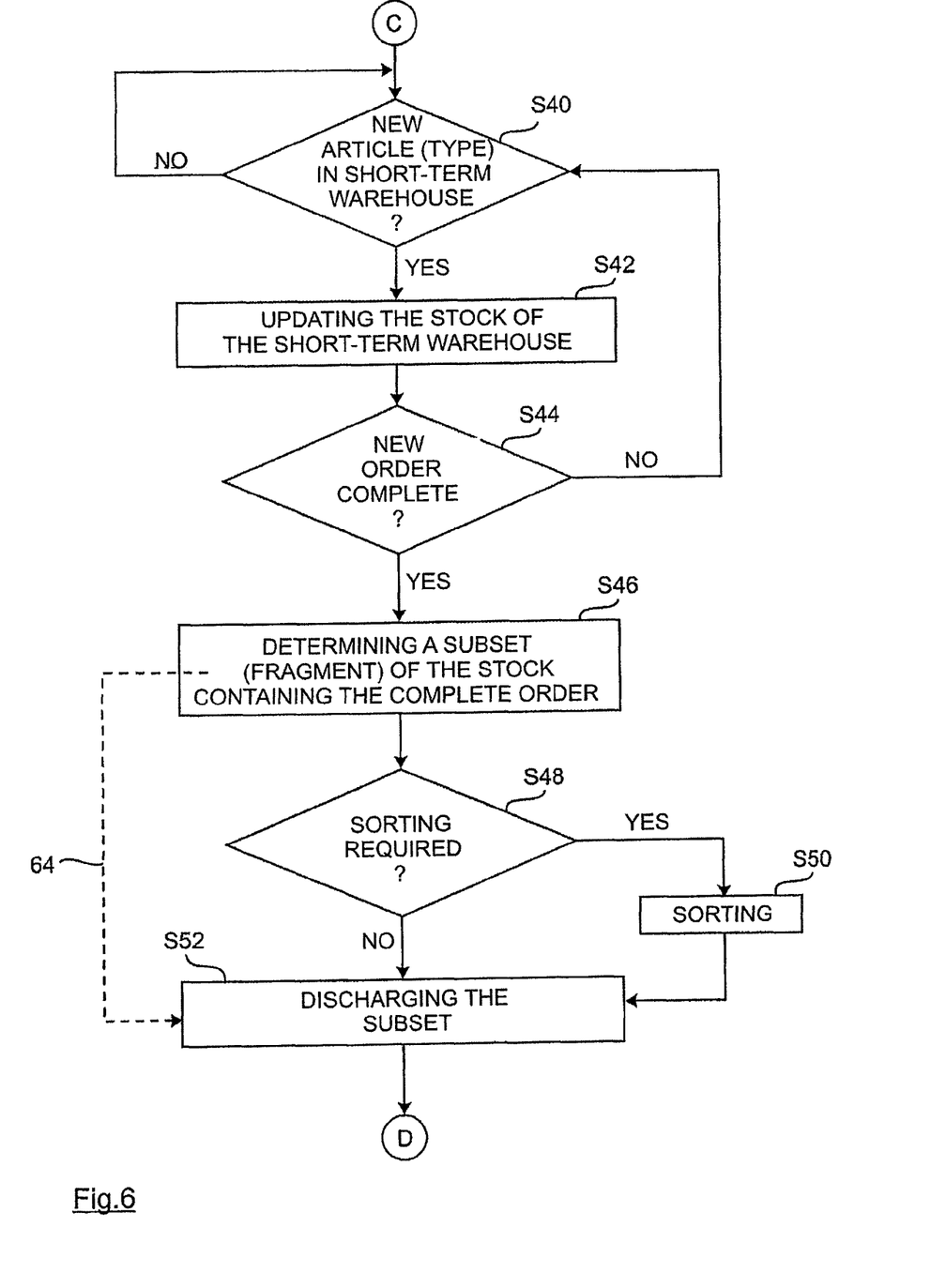
FIG. 6 shows a flowchart of the steps of determining complete orders and discharging subsets in accordance with FIG. 4.

In FIG. 6 a flow chart is shown which explains the method steps S14 and S16 of FIG. 4 in more detail.

The flow chart of FIG. 6 serves for explaining the exemplary case that the control 24 does not have knowledge in advance when and whether one of the orders Ai is complete. In FIG. 6 the control 24 determines again and again whether one of the orders Ai is complete. This check can happen periodically or discretely in dependence on transfer of new articles in accordance with the step S12 (cf. FIG. 4).

After a "new" article-pure group (total requirements) of articles has been transferred from the long-term warehouse 14 to the buffer 16 (cf. step S12 in FIG. 4) in accordance with FIG. 6 in step S40 it can be inquired in a cyclic or discrete manner whether new articles have arrived in the short-term warehouse or the buffer 16. For this purpose, a sensor 66 can be provided at an entrance of the buffer 16. This sensor 66 detects the entry of new articles. Optionally, the sensor 66 can also be adapted to detect the article type Sj. In this case, for example, an RFID reading device can be utilized which communicates with RFID chips attached to an, preferably each, article and carrying the information with regard to the article type Sj. If the inquiry in the step S40 results in the entry of a new article (total requirements) in the buffer 16 article stock in the buffer 16 is updated in step S42. The article stock in the buffer 16 is comparable to an inventory data set. The article stock represents the number of article types Sj present in the buffer 16.

Then, in step S44, it can be inquired whether one of the orders Ai of the analysis quantity AM is now complete, since in the step S40 the entry of one new article (total requirements) has been registered. If none of the orders Ai is complete, it is returned to the step S40. If at least one of the orders Ai is complete, a subset can be determined from the article stock in the step S46, which comprises at least the articles of the at least one complete order. Optionally, it can be inquired in step S48 whether the articles of the subset determined in the step S46 need to be sorted. Sorting can be necessary if the subset determined in the step S46 comprises articles belonging to different complete orders Ai. In this case, it can be desirable to sort the articles with regard to the complete orders. Thus, the sorting can happen in an order-oriented manner.

If it is determined in the step S48 that sorting is required, then in step S50 the stock within the buffer 16 can be (pre-) sorted. It is clear that the buffer 16 in this case is provided with a sorting functionality. If the buffer 16 is not provided with any sorting functionality the subset determined in the step S46 is discharged in step S52, as indicated in FIG. 6 by means of an arrow 64, illustrated by means of broken lines, between the steps S46 and S52. In this case the sorting can also happen later in a separate sorting device (cf., e.g., sorting device 18 in FIG. 1). If it is determined in the step S48 that no sorting is necessary the subset can be discharged in the step S52.

Figure 7:
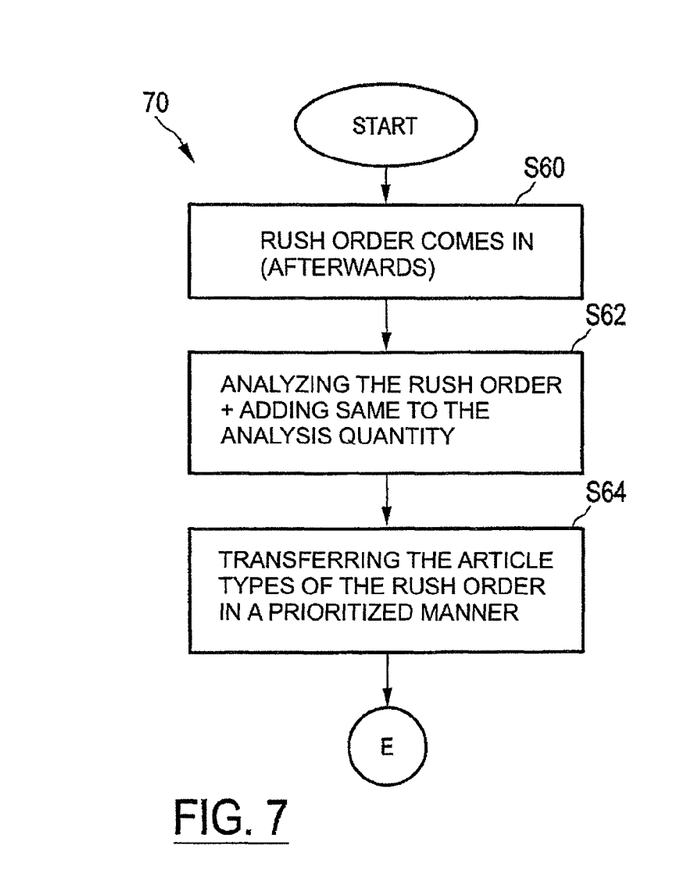
FIG. 7 shows a flowchart for handling a rush order.

In FIG. 7 another flow chart 70 is shown serving for explaining the handling of a rush order.

In a first step S60 it is detected that the rush order is coming in. The entry of the rush order can happen afterwards, i.e. after the analysis quantity AM has been defined (cf. step S10 in FIG. 4). Of course, rush orders can also be received regularly, i.e. before the analysis quantity AM is defined, namely within one of the order slots BS.

In step S62 the rush order is analyzed with regard to the article types Sj contained therein and is added to the analysis quantity AM.

In step S64 the article types Sj of the rush order can be processed in a prioritized manner, and thus can be transferred in a prioritized manner (cf. step S12 in FIG. 4). In terms of the example of FIG. 5B the rush order can be added to the analysis quantity AM of FIG. 5B, for example, after the second analysis run is finished, i.e. after the analysis quantity AM has already been analyzed with regard to the article types "a" and "b". If the rush order comprises, for example, one order of two articles "a" and four articles "t", the article type "a" can be processed (once again) in a third analysis run and subsequently the article type "t" can be processed in a fourth analysis run. Only then the analysis with regard to the article types "z", "c" and "x" follows. As soon as the article types "a" and "t" have been transferred, the rush order is complete and can be discharged (cf. step S16 in FIG. 4).

It is clear that upon the processing of the rush order of the example of FIG. 5B the third analysis with regard to the article type "a" can be omitted (for the time being) since the first (discharged) subset comprises a surplus of five articles "a" after the second order is completely processed. Since the rush order requires two of the articles "a" only, which are already present in the buffer 16 or in the sorting device 18, the analysis with regard to the article type "a" can also be shifted temporarily backwards. The repeated analysis with regard to the article "a" needs to happen at the latest when the articles "a" are no longer sufficiently present in the buffer 16 or in the sorting device 18, so that one of the orders Ai can no longer be served, which actually should have received its articles "a" from the total requirements of the first analysis run.

Figure 8A:
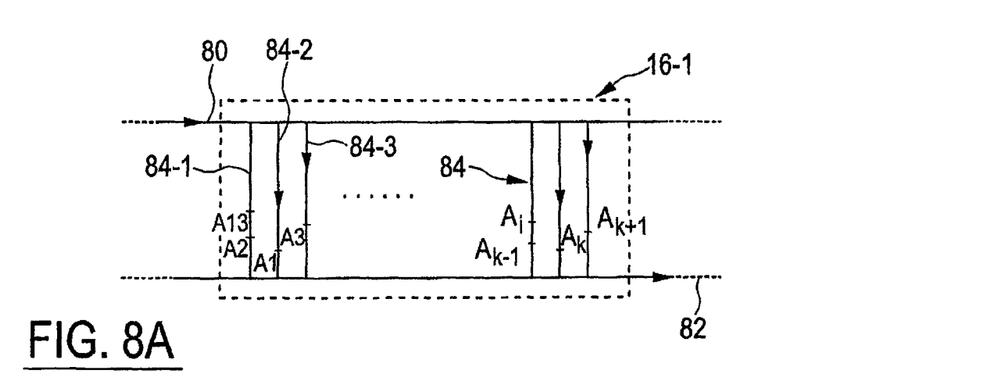
FIGS. 8A and 8B show an exemplary embodiment of the buffer of FIG. 1.
Figure 8B:
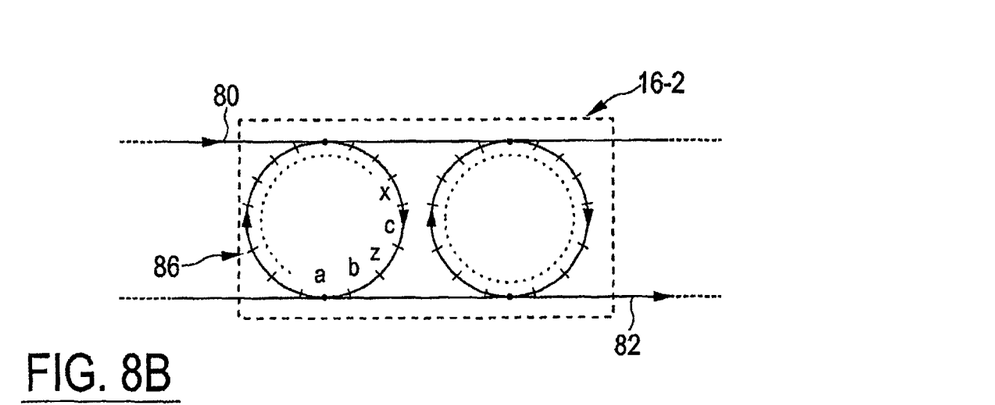

Two embodiments 16-1 and 16-2 of the buffer 16 are schematically illustrated in FIGS. 8A and 8B. Feeding lines 80 and discharging lines 82 are shown. The first buffer 16-1 comprises a plurality of accumulation lines 84 which are preferably oriented substantially straight. The second buffer 16-2 comprises one or more (storing) circles 86. The elements 80-86 can be implemented by conveyor components. Material flow direction is indicated by means of dark arrows.

The first buffer 16-1 of FIG. 8A will be explained hereinafter. The first buffer 16-1 can be provided with a (limited) sorting functionality. The accumulation lines 84 are preferably operated in one direction. Each of the accumulation lines 84 comprises a known capacity for receiving a predetermined number of articles.

Provided that the control 24 has already knowledge of the time when one of the orders Ai of the analysis quantity AM is complete, the accumulation lines 84 can be assigned to areas dedicated to the complete orders Ai. In the example of FIG. 8A, for example, the orders A1 and A13 of the example of FIG. 5B can be assigned to the accumulation line 84-1 arranged the farest downstream. A next, i.e. second, accumulation line 84-2 arranged downstream can be assigned, for example, to the order A1 of FIG. 5B. Ideally, this assignment can be continued for all of the orders Ai of the analysis quantity AM, before a first article from the long-term warehouse 14 is transferred to the buffer 16-1. Whether all of the orders Ai can be assigned to one of the accumulation lines 84 depends on the number of accumulation lines and their respective capacities.

In accordance with the example of FIG. 5B (without a rush order) eight articles "a" and ten articles "b" are transferred from the long-term warehouse 14 to the buffer 16-1 as a first subset. Three articles "a" of the first subset can be transferred to the first accumulation line 84-1 and five articles "a" of the first subset can be transferred to the second accumulation line 84-2. It is clear that the first buffer 16-1 is operated with a corresponding sensor adapted to monitor and coordinate the transfer of the individual articles to the accumulation lines 84 assigned thereto. Further, two articles "b" are transferred to the first accumulation line 84-1 so that the second order A2 is completely present in the first accumulation line 84-1. Three articles "b" are transferred to the second accumulation line 84-2 and five articles "b" of the remaining eight articles "b" are transferred to the third accumulation line 84-3. For illustrating the assignment of accumulation positions of the accumulation lines 84 to the orders Ai areas of the orders A2 and A13 are delimited against each other in the first accumulation line 84-1 by means of horizontal lines. Similar applies to the orders A1 and A3 which are assigned to the accumulation lines 84-2 and 84-3. It is clear that based on the way described above all of the orders Ai can already be sorted in the area of the buffer 16-1 so that a downstream sorting device 18 (cf. FIG. 1) is not required. As soon as one of the orders Ai is completely present in the accumulation line 84 thereof this complete order Ai can be discharged. Thus, complete orders Ai leave the buffer 16-1. If a sorting process is required within one of the orders Ai in accordance with a predetermined sequence the orders Ai can be transferred to a subsequently arranged sorting device 18.

The sorting process for achieving the right sequence can be achieved, amongst other things, by means of the second buffer 16-2. The second buffer 16-2 comprises one or more (storage) circles 86. In FIG. 8B two circles 86 are shown exemplarily. Buffered articles can be moved in a circulating manner within the circles 86. Within the circles 86 areas can be assigned to the respective total requirements of one of the articles. The circle 86 depicted at the left-hand side of FIG. 8B serves for buffering the articles "a", "b", "z", etc. wherein the analysis and transfer sequence of the example of FIG. 5B is referred to. In accordance with the predetermined analysis and transfer sequence first the articles "a" and then the articles "b", etc. are fed to the circle 86. As soon as one of the orders Ai of the analysis quantity AM is complete the articles buffered in the circles 86 can be rotated and discharged such that complete orders arrive at the exit of the buffer 16-2.

The above-described method is particularly suitable for orders which are structured in accordance with the Pareto principle. The Pareto principle defines that in many application cases 80% of the events are caused by 20% of the actors. This is also designated as the 80/20 rule. In logistics the principle is applied with the ABC analysis and describes the situation which occurs frequently wherein 20% of the articles (A-type articles) generate 80% of the throughput. The throughput is a process by which goods of one logistic system are transferred to another logistic system. For example, order-picking is such a process. The ABC analysis is an analysis of an (article) range with regard to the distribution of the articles dependent on a certain criterion. Typical criterions are, for example, turnover, quantity or access frequency. The ABC articles are generated by classifying all of the articles of the article range with regard to the criterion such as the access frequency. The A-type articles have a high access frequency. C-type articles have a low access frequency. The access frequency is to be understood as the number of requirements of one article per time unit.

The above described method can be altered upon knowledge of an ABC distribution of the articles such that, for example, on a speculative basis the C-type articles are retrieved in higher quantities than actually required due to the total requirements of the analysis quantity which is just processed. This means, for example, that if in total three articles of a specific C-type article are present in an analysis quantity, ten articles of this C-type article are transferred to the buffer 16 based on average values gained due to experience. During the processing of the current analysis quantity, then three C-type articles are discharged. The remaining seven C-type articles stay in the buffer 16, which are, however, "consumed"—based on experience—within the course of the subsequent analysis quantities (e.g. within one day). The number of the C-type articles is small in comparison to the capacity of the buffer 16 so this preliminary reduction of the capacity of the buffer 16 is acceptable, because the storage machine in the long-term warehouse 14 needs to be moved only once for this C-type article during this day. In this manner, the performance of the entire system can be increased.

In the above given description identical parts and features are designated by equal reference numerals. The disclosures contained in the specification can be transferred logically to the identical parts and features having the same reference numerals. Position and orientation indications (such as "up", "down", "lateral", "longitudinal", "transversal", "horizontal", "vertical" and the like) are related to the currently described Figure. If the position or orientation is changed these indications are to be transferred logically to the new position or orientation.

What is claimed is:

1. In a distribution system, which comprises a long-term warehouse and a short-term warehouse, a method for arranging articles of different article types in an order-oriented manner from the long-term warehouse in accordance with a plurality of orders, comprising the following steps:
    a) defining an analysis quantity, which comprises a quantity of several orders, wherein each of the orders of the analysis quantity comprises at least one order line, wherein each of the order lines respectively specifies an ordered article with regard to the respective article type and with regard to a respectively ordered number of pieces;
    b) transferring stored articles in an article-oriented manner from the long-term warehouse to the short-term warehouse comprising the steps of:
        i) selecting an arbitrary one of the article types contained in the analysis quantity;
        ii) analyzing each of the orders of the analysis quantity in dependence on the selected article type;
        iii) determining total requirements of the selected article type;
        iv) transferring the total requirements of the selected article type from the long-term warehouse to the short-term warehouse;
        v) repeating the steps i) to iv) for another one of the article types contained in the analysis quantity, which has not yet been selected, until each one of the article types contained in the analysis quantity is selected, analyzed and transferred;
    c) determining at least one complete order, wherein a complete order is one of the orders of the analysis quantity the associated articles of which are all already located in the short-term warehouse;
    d) discharging a subset of the transferred articles from the short-term warehouse, wherein the subset comprises at least each of the ordered articles of the at least one complete order; and
    e) repeating the steps c) and d) until each of the orders of the analysis quantity is completed; and
    wherein the step of determining at least one complete order comprises repeatedly determining and checking the transferred articles with regard to complete orders; and
    wherein the step of discharging happens while additional ones of the article types, which have been selected newly, are transferred in an article-oriented manner.

2. The method of claim 1, wherein the step of transferring stored articles in an article-pure oriented manner from the long-term warehouse to the short-term warehouse happens quasi-continuously.

3. The method of claim 1, wherein a first one of the article types is selected during a first run of the step i) which belongs to a first one of the orders, and wherein during a subsequent run of the step i) at first such ones of the article types are selected next which also belong to the first one of the orders before another one of the article types is selected, which belongs to another one of the orders.

4. The method of claim 1, wherein the article types are selected in an order-oriented manner in the step i).

5. The method of claim 1, wherein the short-term warehouse is dimensioned such that one or more of the complete orders are collected in the short-term warehouse before the short-term warehouse is full.

6. The method of claim 1, wherein a storage capacity of the short-term warehouse is smaller than a total number of each of the ordered articles from each of the orders of the analysis quantity.

7. The method of claim 1, wherein the ordered articles are distributed in accordance with the Pareto principle.

8. The method of claim 7, wherein one or more different C-type articles are transferred speculatively to the short-term warehouse based on average values in an article-oriented manner so that the article-oriented transfer happens only once for each of the article types belonging to the C-type articles.

9. The method of claim 1, wherein the analysis quantity is analyzed for the article types contained in the analysis quantity before the step of the article-oriented transfer, in order to generate an overview of the different article types from which respectively one is selected in the step i).

10. The method of claim 1, wherein each of the method steps is conducted automatically.

11. The method of claim 1, wherein the step of checking for complete orders comprises:
    detecting the transferred articles with regard to the respective article type thereof and with regard to the associated number of pieces, which are presently located in the short-term warehouse; and
    determining for each of the orders of the analysis quantity, by way of comparison, whether each of the associated ordered articles is detected in dependence on the article types thereof and on the respective numbers of pieces.

12. The method of claim 1, wherein a rush order comprising a high processing priority is added to the analysis quantity afterwards, and analyzed with regard to the article types thereof, wherein the article types of the rush order are processed in accordance with the processing priority temporarily before the article types which have not been selected yet and which comprise a low processing priority.

13. The method of claim 1, wherein the discharged subset of the step d) is transferred to a sorting device, wherein the articles belonging to the complete orders are sorted out in the sorting device and remaining articles not belonging to any one of the complete orders are buffered until missing articles are discharged to the sorting device which define new complete orders together with the remaining articles.

14. The method of claim 1 further comprising the steps of:
    collecting a first group of orders which comprises more than the several orders, which lie within a first time window, wherein the analysis quantity corresponds to a second group of orders lying within a second time window which is smaller than the first time window; and
    repeatedly returning to the step a) if each of the orders of the analysis quantity is completed in order to define, based on the orders of the first group, a new analysis quantity which lies outside of the second time window and within the first time window, until each of the orders of the first group is completed and has been discharged.

15. A distribution system comprising
    a long-term warehouse,
    a short-term warehouse,
    a conveyor, and
    a control,
    wherein the conveyor connects the long-term warehouse in a conveying manner to the short-term warehouse, and
    wherein the control is adapted to execute the following steps:
    a) defining an analysis quantity, which comprises a quantity of several orders, wherein each of the orders of the analysis quantity comprises at least one order line, wherein each of the order lines respectively specifies an ordered article with regard to the respective article type and with regard to a respectively ordered number of pieces;
    b) transferring stored articles in an article-oriented manner from the long-term warehouse to the short-term warehouse comprising the steps of:
        i) selecting an arbitrary one of the article types contained in the analysis quantity;
        ii) analyzing each of the orders of the analysis quantity in dependence on the selected article type;
        iii) determining total requirements of the selected article type;
        iv) transferring the total requirements of the selected article type from the long-term warehouse to the short-term warehouse; and
        v) repeating the steps i) to iv) for another one of the article types contained in the analysis quantity, which has not yet been selected, until each one of the article types contained in the analysis quantity is selected, analyzed and transferred;
    c) determining at least one complete order, wherein a complete order is one of the orders of the analysis quantity the associated articles of which are all already located in the short-term warehouse;
    d) discharging a subset of the transferred articles from the short-term warehouse, wherein the subset comprises at least each of the ordered articles of the at least one complete order; and
    e) repeating the steps c) and d) until each of the orders of the analysis quantity is completed.

16. A computer program product comprising a computer program stored on a non-transitory computer readable medium, which program causes a computer to execute a method comprising the steps of:
    a) defining an analysis quantity, which comprises a quantity of several orders, wherein each of the orders of the analysis quantity comprises at least one order line, wherein each of the order lines respectively specifies an ordered article with regard to the respective article type and with regard to a respectively ordered number of pieces;
    b) transferring stored articles in an article-oriented manner from the long-term warehouse to the short-term warehouse comprising the steps of:
        i) selecting an arbitrary one of the article types contained in the analysis quantity;
        ii) analyzing each of the orders of the analysis quantity in dependence on the selected article type;
        iii) determining total requirements of the selected article type;
        iv) transferring the total requirements of the selected article type from the long-term warehouse to the short-term warehouse; and
        v) repeating the steps i) to iv) for another one of the article types contained in the analysis quantity, which has not yet been selected, until each one of the article types contained in the analysis quantity is selected, analyzed and transferred;
    c) determining at least one complete order, wherein a complete order is one of the orders of the analysis quantity the associated articles of which are all already located in the short-term warehouse;
    d) discharging a subset of the transferred articles from the short-term warehouse, wherein the subset comprises at least each of the ordered articles of the at least one complete order; and
    e) repeating the steps c) and d) until each of the orders of the analysis quantity is completed.

* * * * *